United States Patent [19]

Naylor et al.

[11] Patent Number: 5,806,034
[45] Date of Patent: Sep. 8, 1998

[54] SPEAKER INDEPENDENT SPEECH RECOGNITION METHOD UTILIZING MULTIPLE TRAINING ITERATIONS

[75] Inventors: Joe A. Naylor; William Y. Huang; Lawrence G. Bahler, all of San Diego, Calif.

[73] Assignee: ITT Corporation, New York, N.Y.

[21] Appl. No.: 510,321

[22] Filed: Aug. 2, 1995

[51] Int. Cl.$^6$ .................................................. G10L 9/06
[52] U.S. Cl. ................ 704/256; 704/238; 704/242; 704/244
[58] Field of Search ................... 395/2.65, 2.49, 395/2.5, 2.52, 2.45, 2.48, 2.63, 2.64, 2.43, 2.51, 2.47, 2.53, 2.54

[56] References Cited

U.S. PATENT DOCUMENTS

| | | | |
|---|---|---|---|
| 4,481,593 | 11/1984 | Bahler | 704/253 |
| 4,713,777 | 12/1987 | Klovstad et al. | 395/2.42 |
| 4,797,927 | 1/1989 | Schaire | 395/2.61 |
| 4,856,068 | 8/1989 | Quatieri, Jr. et al. | 395/2.36 |
| 4,903,305 | 2/1990 | Gillick | 704/245 |
| 5,027,406 | 6/1991 | Roberts et al. | 395/2.53 |
| 5,097,407 | 3/1992 | Hino et al. | 395/385 |
| 5,163,133 | 11/1992 | Morgan et al. | 395/800 |
| 5,268,990 | 12/1993 | Cohen et al. | 395/2.09 |
| 5,271,088 | 12/1993 | Bahler | 395/2.09 |
| 5,365,574 | 11/1994 | Hunt et al. | 379/88 |
| 5,457,783 | 10/1995 | Chhatwal | 395/2.28 |
| 5,459,809 | 10/1995 | Kim et al. | 382/160 |
| 5,546,499 | 8/1996 | Lynch et al. | 395/2.49 |

*Primary Examiner*—David R. Hudspeth
*Assistant Examiner*—Donald L. Storm
*Attorney, Agent, or Firm*—Plevy & Associates

[57] ABSTRACT

A method for recognizing spoken utterances of a speaker is disclosed, the method comprising the steps of providing a database of labeled speech data; providing a prototype of a Hidden Markov Model (HMM) definition to define the characteristics of the HMM; and parameterizing speech utterances according to one of linear prediction parameters or Mel-scale filter bank parameters. The method further includes selecting a frame period for accommodating the parameters and generating HMMs and decoding to specified speech utterances by causing the user to utter predefined training speech utterances for each HMM. The method then statistically computes the generated HMMs with the prototype HMM to provide a set of fully trained HMMs for each utterance indicative of the speaker. The trained HMMs are used for recognizing a speaker by computing Laplacian distances via distance table lookup for utterances of the speaker during the selected frame period; and iteratively decoding node transitions corresponding to the spoken utterances during the selected frame period to determine which predefined utterance is present.

9 Claims, 8 Drawing Sheets

SPEAKER INDEPENDENT SPEECH RECOGNITION METHOD UTILIZING MULTIPLE TRAINING ITERATIONS

FIELD OF THE INVENTION

The present invention relates generally to voice recognition, and more particularly, to a system and method for operating devices through voice commands.

BACKGROUND OF THE INVENTION

It is often desirable to operate machines through voice commands and instructions. The prior art is replete with references that teach the operation of machines through voice recognition. These systems operate by recognizing isolated or connected utterances by comparing unknown audio signals suitably processed with one or more previously prepared (trained) representations of known signals. Such previously prepared representations are often in the form of models that have been prepared by known statistical methods.

Modern statistical methods of speech recognition are based on the assumption that the sequence of acoustic observations corresponding to an unknown utterance to be recognized is accounted for by a path through a statistical model, such as a hidden Markov Model (HMM), which serves as a speech production model. In general, HMMs build probablistic models of a speech signal that describes its time-varying characteristics. It is a doubly stochastic process in that it has an underlying stochastic process that is not observable (hence the term hidden), but can be observed through another stochastic process that produces a sequence of observations. Essentially, the HMM is a stochastic model which uses state transition and output probabilities to generate observation sequences. For a detailed analysis of HMMs, see the article by S. E. Levinson, L. R. Rabiner and M. M. Sondhi (1983) entitled: "An introduction to the application of the theory of probabilistic functions of a Markov process to automatic speech recognition" B.S.T.J., 62(4), 1035–1074; see also: "Speech Recognition By Probability Models" by Seiichi Nakagawa (Society of Electronic Information Conmmunication), pp. 33–40.

Several types of HMMs are available for performing voice recognition functions. Of the HMMs employed, continuous density HMMs provide superior representation characteristics and level recognition performance. A continuous density HMM represents a feature sequence composed of continuous vectors. The probability of a feature vector of a continuous density HMM is represented in the form of a continuous density such as a Gaussian distribution. In particular, in the case of a continuous mixture density HMM, an output probability density is usually represented by a plurality of Gaussian distributions, each Gaussian distribution being defined by a variance (covariance) matrix between a central vector and the parameters and by branch probabilities corresponding to weights on distributions. A probability in which each of the Gaussians constituting a continuous mixture density will be output with respect to a certain vector is called a "partial probability". Continuous density HMMs are described in detail in an article entitled "Recognition of Isolated Digits Using Hidden Markov Models with continuous Mixture Densities" by L. R. Rabiner, B. H. Juang, S. E. Levinson and M. M. Sondhi (AT&T Technical Journal Vol. 64, No. 6, July–August 1985).

Several commercial software kits are available for building and manipulating (training) continuous density HMMs. For example, the software toolkit HTK Version 1.4, which is available from Lynxvale Limited, 20 Trumpington Street, Cambridge CB2 1QA, England, builds such models. It can be used for whole word recognition, word spotting, large vocabulary word recognition using phone models, speaker identifications, and for many other pattern matching applications.

However, there are some inherent limitations in using a statistical model that is provided from a software package such as the toolkit HTK Version 1.4. For example, attempts at increasing performance of such statistical models usually requires much larger data bases than available. Additionally, such models tend to be overly-sensitive to the details of the modeling assumptions and fail to adequately generalize and learn the general distinctions that are common among the words to be recognized as opposed to the particular distinctions that are embodied in the model data that may not be present, such as specific speaker, stress and noise conditions. Further, the recognizers incorporating such models typically are inefficient and slow, requiring an excess amount of time to be spent on improving the variants of the recognizer. Still further, such prior art attempts typically implement a straightforward Viterbi algorithm for speech recognition, which is too time and memory intensive for real time performance. Generally, a Viterbi algorithm is an algorithm for finding the optimal state sequence through an HMM given a particular observation sequence. Finally, attempts to capture more details from the data by increasing the number of iterations or training passes often results in worse performance by the statistical models.

Accordingly, it is the object of the present invention to substantially overcome or eliminate such disadvantages by providing a system and method for operating devices through verbal commands that is more efficient and accurate than those of the prior art.

SUMMARY OF THE INVENTION

The present invention is a system and method for operating devices through verbal commands having stored in memory trained Hidden Markov Models (HHMs) for recognizing in real time incoming speech components having a plurality of speech frames including a processing means for storing a Viterbi algorithm capable of performing speech recognition by using the stored HMMs for a plurality of speech iterations. The processing means including memory means for storing at least two columns of a Viterbi Lattice for each of the speech iterations.

Additionally, the system and method includes a means for normalizing a probability at each iteration according to a plurality of ranges in each stored column to provide a given integer indicative of the probability of a processed speech arrangement or component corresponding to a known stored HMM value.

Further, the system and method includes a means for applying the normalized probabilities to the processed speech components to provide a mean vector range for mapping all of the speech frames. Finally, the system and method includes a means for selecting a given speech value for each of the frames according to a mean vector of the mean vector range having the highest probability for that speech component.

BRIEF DESCRIPTION OF THE DRAWINGS

The foregoing and other objects, features, and advantages of the invention will be apparent from the following more particular description of the preferred embodiments of the invention, as illustrated in the accompanying drawings, wherein.

DETAILED DESCRIPTION OF THE INVENTION

The present invention combines an algorithm for training hidden Markov models (HMM) and an algorithm for recognizing unknown utterances to provide a voice recognition system and method. Although the present invention was developed to perform radio-control tasks, it should be understood that the present invention is not limited to this particular environment, and can be utilized to verbally operate virtually any machine or device.

The voice recognition system and method of the present invention is provided as two embodiments, a SPARC workstation implementation and a Digital Signal Processor (DSP) chip implementation. Accordingly, the recognition system and method will be described in three parts. The first part describes an improved algorithm for training hidden Markov models, which is common to both embodiments. The second part describes a voice recognition system and method that is implemented on a SPARC workstation. The third part describes a voice recognition system and method that is coded on a DSP chip.

The training algorithm of the present invention is a modification to the software toolkit HTK Version 1.4, which is available from Lynxvale Limited, 20 Trumpington Street, Cambridge CB2 1QA, England. Basically, the algorithm comprises a plurality of training modules which interface externally via a plurality of library modules to train HMMs. Generally, the library modules read in a pre-developed HMM definition, produce new estimates of its parameters using a labeled speech data file, and then write out the revised definition.

Figure 1:
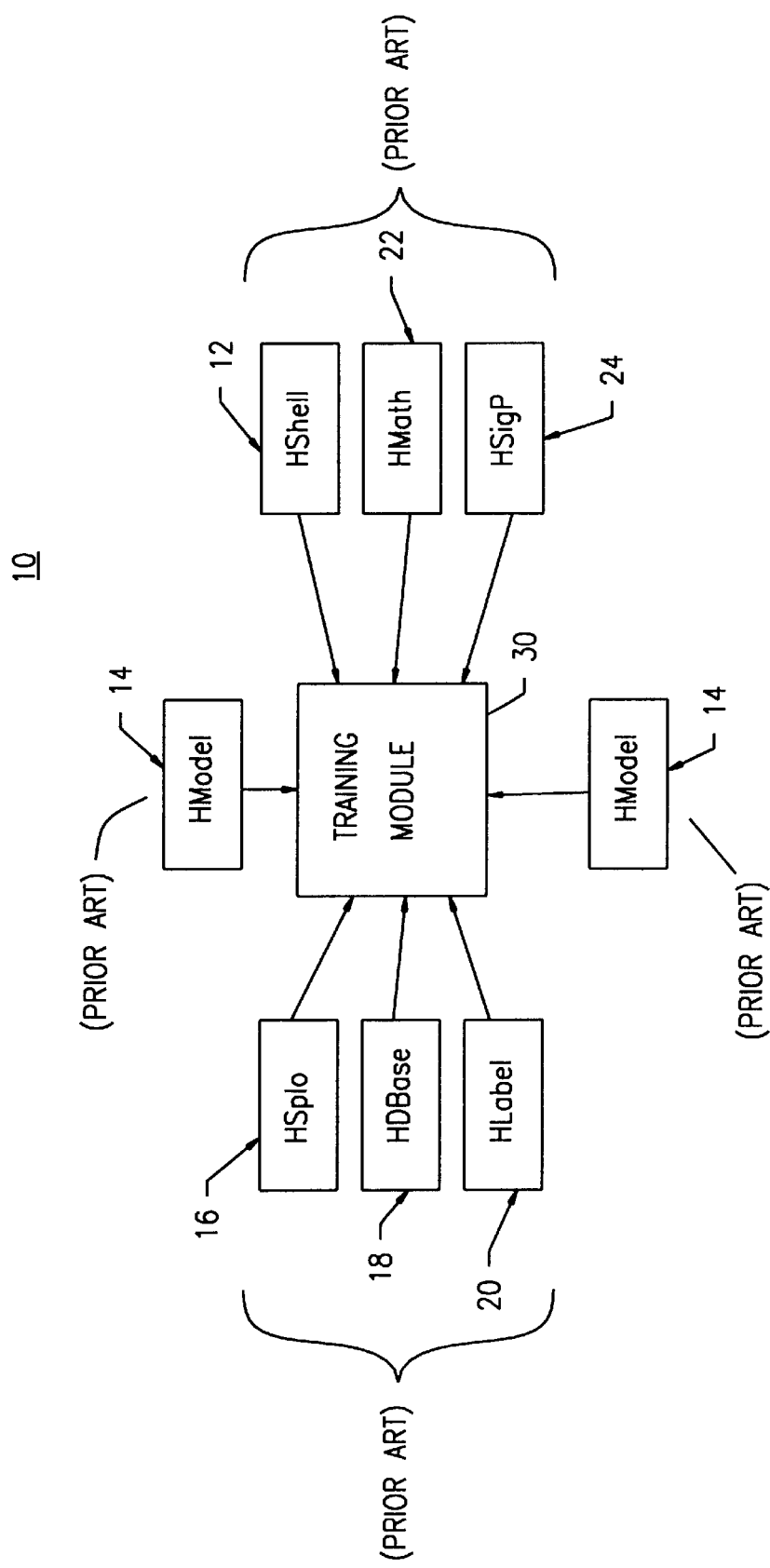
FIG. 1 is a schematic diagram of the library modules of the present invention.

Referring to FIG. 1, a schematic diagram 10 is provided for illustrating the interaction of the library modules with a typical training module 30. For example, the module HShell 12 is provided for operating the system interface. Input and output of the HMM is performed using the module HModel 14, which converts between an external textual representation and an internal memory representation. Speech data is input through the module HSpIO 16, which simplifies the process of reading in the data and performs automatic parameter conversion. For example, data is compacted and stored using 16 bit integer reflection coefficients but converted automatically to linear prediction cepstral coefficients during the load-in process. Further, the module HSpIO 16 appends first and second order difference coefficients during load-in.

Once the module HSpIO 16 is read in, segments of training data that are provided by the module HDBase 18 are stored within the database which allows the algorithm to cyclically process training examples efficiently. Next, files containing labeling information are input via the module HLabel 20. The module HLabel 20 translates a variety of external formats into the HTK internal format, in which all times are absolute rather than relative to the sampling rate. Further, a plurality of options are entered along with the names of necessary data files as command line arguments.

Additionally, the module HShell 12 provides the necessary interface to allow the plurality of options to work with different command line interpreters. Finally, several of the training modules provided utilize the module HMath 22 for providing math support and the module HSigP 24 for providing signal processing support.

Figure 2:
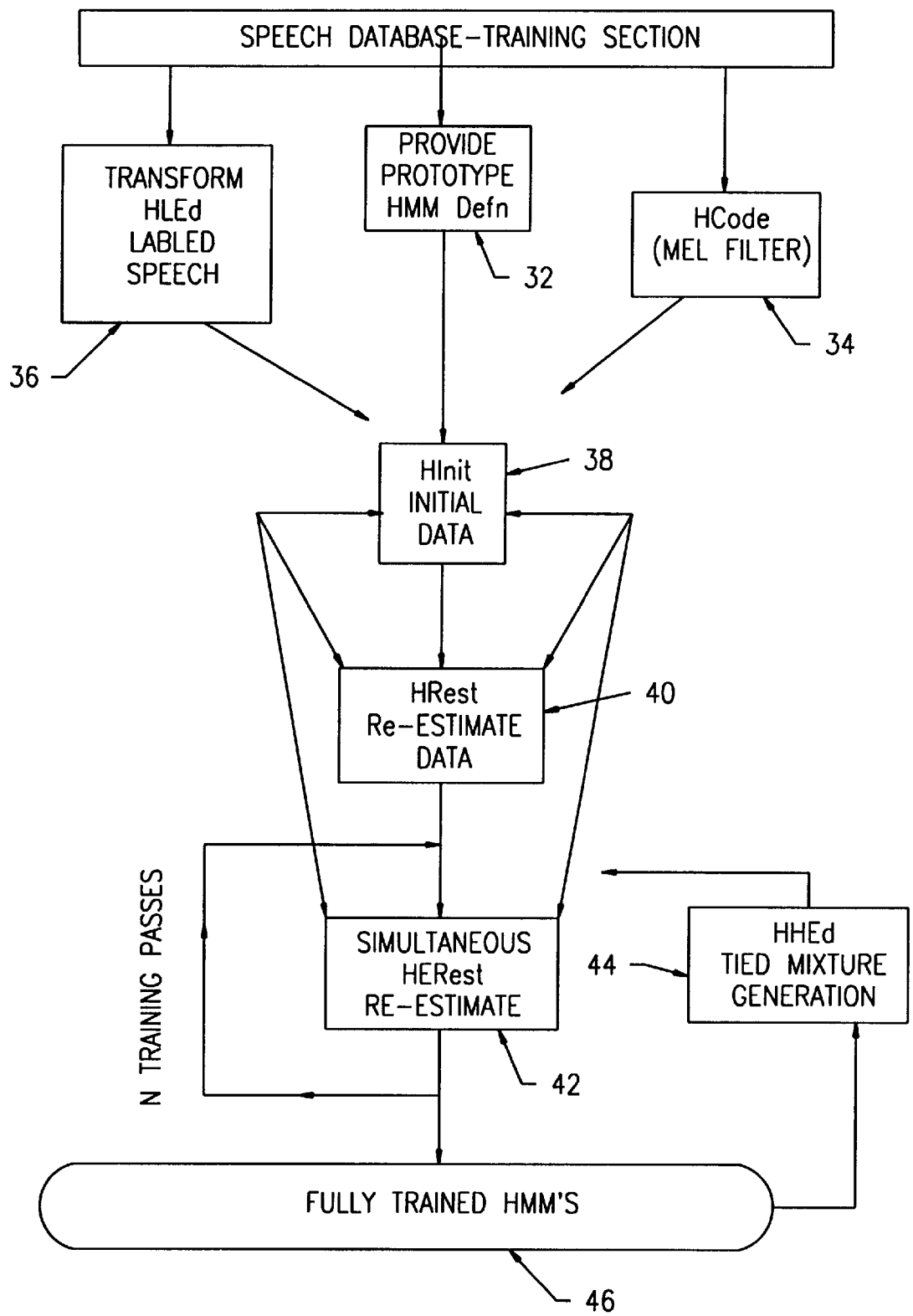
FIG. 2 is a schematic diagram of the training algorithm of the present invention.

Referring to FIG. 2, a schematic diagram is provided illustrating the training of the HMMs of the present invention. Generally, the process begins by providing a database of labelled speech data and a prototype HMM definition 32, which defines the topology and characteristics of the HMM.

The topology and characteristics of the present invention are the same as those found in the HTK Toolkit disclosed herein, with several exceptions. First, parameterization includes a set of 8 mel frequency cepstra (MFCC), with energy appended. Second, the parameterization includes the deltas of these parameters, for a total of 18 parameters per frame. Third, although each new frame has twice the standard duration, a standard HTK linear regression is performed across a range of frames from +2 to −2 frames. Finally, although standard usage of HTK often appends acceleration terms, they are not provided herein.

Additional front end settings include frame periods of 20 ms, instead of the conventional 10 ms frame rate. This provides a potential four fold saving in computation without decreasing performance. Further, the present invention include window durations up to 25 msecs, hamming windows, preemphasis coefficient set to 1.0, and log energy or C_0 scaled by 1.0. Finally, blind deconvolutions and cepstral mean subtractions are not performed, since the utterances are too short for simple means to be effective.

Prior to the HMM training, if the speech data is stored as a raw waveform, it must be parameterized. Accordingly, the training module HCode 34 is provided for converting the raw waveform to either Linear Prediction parameters or Mel-Scale Filter-bank parameters. Second, if the label data requires manipulation, the training module HLEd 36 can transform the transcription into the desired form. For example, if the transcriptions given in the database have too fine an acoustic level, groups of labels can be merged to provide the required phonemic labelling. Finally, the speech data is hand marked to seed the training. In the present invention, although three speakers' data were hand marked, only two speakers were used because a gross look of errors in the third speaker's marking showed several unreasonable durations.

The actual training process occurs in 3 stages. The first two stages are performed by the training modules HInit 38 and HRest 40 and involve isolated word style training using the fully labelled bootstrap data. Each of the required HMMs is generated individually. HInit 38 reads in all of the bootstrap training data and it cuts out all of the examples of the required phoneme. It then iteratively computes an initial set of parameter values using segmental k-means.

In the first stage, training data is uniformly segmented. Each model state is matched with corresponding data segments and the means and variances are estimated. If multiple mixture models are being trained, then a modified form of k-means clustering is used.

In the second and successive stages, the uniform segmentation is replaced by Viterbi alignment techniques, which are well known in the prior art. The initial parameter values computed by the training module HInit 38 are then further reestimated by the training module HRest 40. Again, the fully labelled bootstrap data is used. However, the segmental k-means is replaced by Baum-Welch (Gaussian) reestimation. It should be understood that the present invention is not limited to Baum-Welch or other Gaussian estimation techniques.

In the third stage, training is performed by the core training module, HERest 42, which utilizes the entire set of training modules and embedded training and provides the required set of continuous density HMM phoneme models over a plurality of training passes. Unlike training techniques of the prior art which could not successfully perform several training passes without incurring larger error rates on validation data, the present invention successfully performs 50, 75, and 100 training passes while continuing to improve performance on the validation set. Accordingly, it is recommended that at least 30 training passes are performed.

Specifically, the training module HERest 42 performs a single Baum-Welch reestimation for the entire set of HMM phoneme models simultaneously. For each training utterance, the corresponding phoneme models are concatenated and the forward-backward algorithm is used to accumulate the statistics of the state occupation, means, variances, etc., for each HMM in the sequence. When all of the training data has been processed, the accumulated statistics are used to compute the reestimates of the HMM parameters to provide a plurality of fully trained HMMs 46.

Finally, the present invention provides a mechanism for generalized tying. In other words, arbitrary subsets of similar parameters can be tied together by the training module HHEd 44, the HMM definition editor. The process includes providing a set of tyings using the training module HHEd 44 and reestimating the parameters of the tied HMM set via the training module HERest 42. For example, providing a set of tied mixture phoneme models requires a set of ordinary continuous density HMMs to be trained, containing between them enough mixtures to fill the required tied mixture codebook. Accordingly, the training module HHEd 44 ties all the mixtures across all states of all models. Thus, reestimation through the training module HERest 42 provides the required tied mixture phoneme models. Further, composite data consisting of speech parameters, difference coefficients, and energy can also be split into independent data streams to provide multiple codebooks. Finally, if context dependent tied-mixture are required, the training module HSmooth (not shown) can provide deleted interpolation of the mixture weights in the final stage of embedded training. The HMM model was for whole words without phonetic ties at a subword level.

In addition to the training modules described above, the following training modules (not shown) are also provided by the training algorithm, HList for listing the information and contents of a data file, HLStats for computing various label file statistics such as frequencies of occurrence and average durations, and constructs bigrams for use by HVite, HSLab, an interactive label editor, for transcribing recorded speech, HLab2Net for translating a label transcription into the equivalent syntax network, HCompV for computing the speech data covariance to initialize fixed variance HMMs, HSource for generating pseudo-speech data using a given HMM as a statistical source, Hcopy for providing copy, concatenate and segment speech data files, HSGen for generating a random list of sentences from a given finite state grammar, HSPar for providing parse sentences given a finite state grammar, and HTNet for compacting a set of trephone HMMs and generate a recognition syntax for testing.

The training algorithm discussed above has been incorporated into two exemplary embodiments of the voice recognition system and method of the present invention. The first exemplary embodiment is a fixed-point version of the voice recognition system and method implemented on a SPARC workstation running SunOS 4.1.1, SunOS 5.3, and on an i486 running Linux 1.1.18. However, it should be understood that any processing unit capable of performing fixed-point recognition falls within the scope of this invention.

Figure 3:
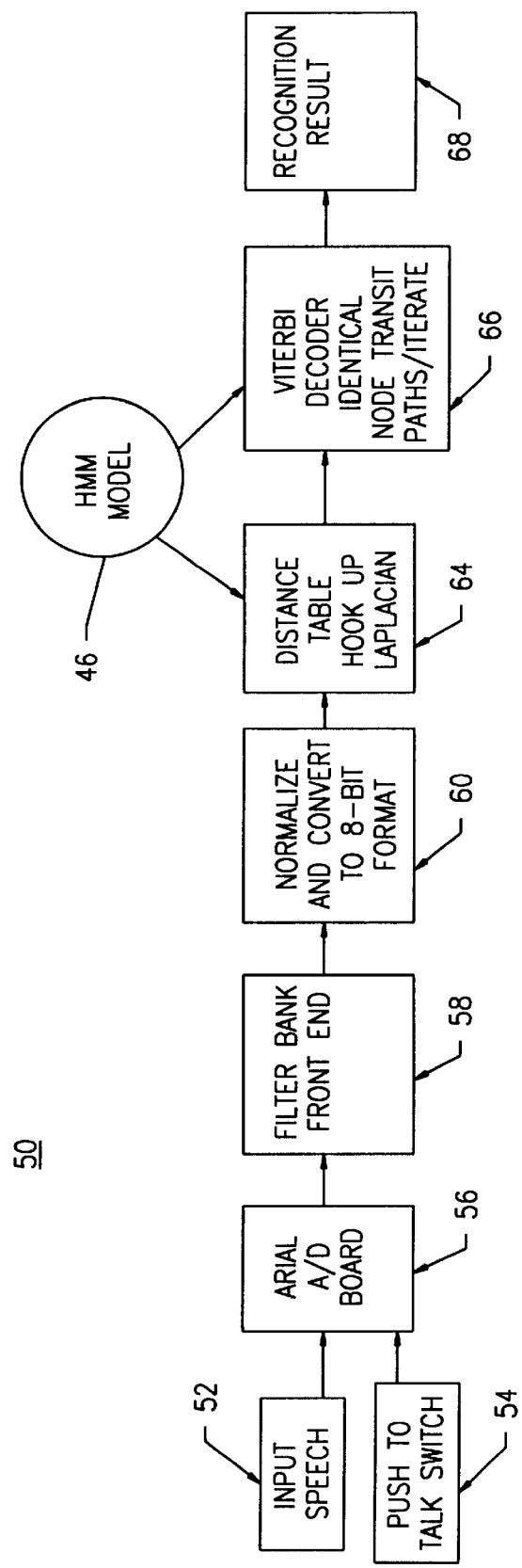
FIG. 3 is a schematic diagram of the SPARC implementation of the present invention.

A schematic of the SPARC implementation 50 is shown in FIG. 3. In the SPARC implementation 50 of the present invention, nineteen speakers participated in the data collection effort, out of which fifteen speakers were used to record 52 the training set. The male speakers were prompted to utter multiple examples of radio-control phrases to be recorded through a H-250/U handset with push-to-talk 54. At least one set of fifty phrases was recorded from each of the participating speakers. Microphone placement, particularly the location of the push-to-talk handset relative to the talker's mouths, was not controlled. It should be understood that the number of speakers, sex of the speakers, and method of recordation of the data can be varied.

The database of the present invention was collected through a single microphone and the entire database was listened to. Large channel variations other than speaker variability were not present. Utterances below tolerance levels (about 3% in the embodiment) were removed from the training material.

The resulting vocabulary comprises 54 words, which include some radio control words such as "frequency", "power", etc., and the complete set of alpha-digits: alpha, bravo, charlie, delta, echo, foxtrot, golf, hotel, india, juliet, kilo, lima, like, november, oscar, quebec, romeo, sierra, tango, uniform, victor, whiskey, xray, yankee, zulu, zero, one, two three, four, five, six, seven, eight, niner. The alpha-digit set provided was designed for maximum acoustic distinctiveness within the set. Additionally, the vocabulary provided future flexibility by assigning a special word sequence to each unique radio interface action, for allowing future designers to control the fundamental communications tradeoff of speed versus accuracy. It should be understood that the vocabulary of the present invention is not limited to the above and can be varied to include any words, terms, or phrases.

After the speech is recorded it is digitized by an Ariel A/D Board 56. Any means for converting analog to digital falls within the scope of this invention. Next, the speech is filtered via a filterbank frontend 58. Any filtering means known in the art can be utilized for this purpose and falls within the scope of this invention. Finally, 8 and 16-bit integers are provided to represent probabilities, instead of a commonly used floating point system of the prior art. In fact, tests performed on the SPARC workstation did not show any degradation of performance as compared to a floating point version of the same algorithm.

The next step includes the normalization 60 of the probabilities after each iteration by the mean vector range. Generally, a minimum and maximum range is normalized by the global diagonal covariances and compiled for all the means vectors. A detailed explanation of global diagonal covariance matrices is provided in the article by J. R.

Bellegarda and D. Nahamoo, entitled "Tied Mixture Continuous Parameter Models for Large Vocabulary Isolated Speech Recognition," Proc. Internati. Conf. Acoust., Speech, and Sig. Proc., vol. 1, p.13, May 1989.

The minimum and maximum range is used to map all future input speech frames to the 0–256 range corresponding to an 8-bit integer. Inputs which exceed this range are clipped. The probabilities generated from this range fit into a 16-bit format. Each column of the Viterbi lattice is then normalized by the maximum range in the previous column to prevent overflow and to provide good dynamic range.

After the probabilities are normalized, the HHMs 46 generated by the training algorithm described above are read into the system. Recognition results 68 are provided via a distance look-up table 64 that provides Laplacean distances and an improved Viterbi algorithm. The Laplacean distance computation (table look-up) implemented is similar to the computation method used in the "Sorter" project, which is described in detail in the article, "Automated Sorted of Voice Messages Through Speaker Spotting", A. Higgins, L. Bahler, J. Porter, J. Naylor, and W. Huang, Final Report MDA904-90-C-5277, 1993. However, Laplacean distances, rather than Euclidean distances are stored in the look-up table. Laplacean distances computed in this fashion are numerically identical to those computed by conventional methods of the prior art. Finally, two 8-bit integers are concatenated to form a 16-bit integer, which is used to index the look-up table to compute distances.

After Laplacean distances are computed, all of the grammar and node paths are precomputed by a Viterbi algorithm via a Viterbi decoder 66. The Viterbi decoder computation is dominated by non-consecutive pointers and memory access. Since modern CPUs are designed to be efficient when memory access is consecutive, CPU's with large cache memory provide efficient non-consecutive memory operations if limited to a compact (i.e. short) memory range.

In the Viterbi decoding of the present embodiment, no pruning occurs. The sequence of node transition paths due to grammar or word model transitions are identical at each iteration. Additionally, the sequence of computations required for each iteration is computed at the beginning of the computation and is placed in a linear stack. Next, the stack programs the algorithm for the sequence of computations necessary for each iteration. Memory access of the input nodes and Gaussian mixture probability observations are performed using nonconsecutive pointer operations, although all other procedures are consecutive. Although input node probabilities and observations are contained within a compact memory space, computers that have large cache memories such as the SPARC used in the present embodiment perform satisfactorily. Further, widely scattered memory components made consecutive by the stack include grammar/inter-word transition probabilities and mixtures weights. Finally, all observations probabilities are computed before each Viterbi lattice column is filled, and only two columns of the Viterbi lattice were stored at each iteration.

Finally, metanodes (not shown) are provided between words to reduce word interconnectivity, due to the high perplexity of the alpha-digit strings. The use of metanodes greatly improves the efficiency of computing the probability of Viterbi lattice elements that are characterized by a large number of node interconnections, which typically occurs between word boundaries. Further, the computation of the metanodes in the present embodiment is greatly simplified by utilizing the sign bit to flag a metanode, which provides the metanodes the same treatment as "normal" nodes.

The metanodes arrays are allocated in the software and may be accessed via negative indices. In fact, the portions of the code that require differentiation of the metanodes from "normal" nodes, such as Viterbi backtracing, are not computationally intensive. Finally, the metanodes reduce the computation from (N×M) to (N+M) connections for a full connection between N from-nodes to M to-nodes, and incur only a small loss in generality.

In addition to the SPARC implementation described above, a real-time DSP implementation 70 of the voice recognition system and method is coded on a TMS320C51 Digital Signal Processor. The algorithm is written in the TMS320C50 assembly language and tested on an Evaluation Module. It should be understood that the present invention is not restricted to a TMS300C51 DSP and can be written in languages other than assembly.

Basically, the DSP processes each frame of input speech, and returns the decoded symbol string to the host process at the end of the input stream. The DSP implementation 70 utilizes the same parameters and frame rate as the SPARC fixed-point implementation discussed above. However, the DSP is only used for recognition, not for training.

Figure 4:
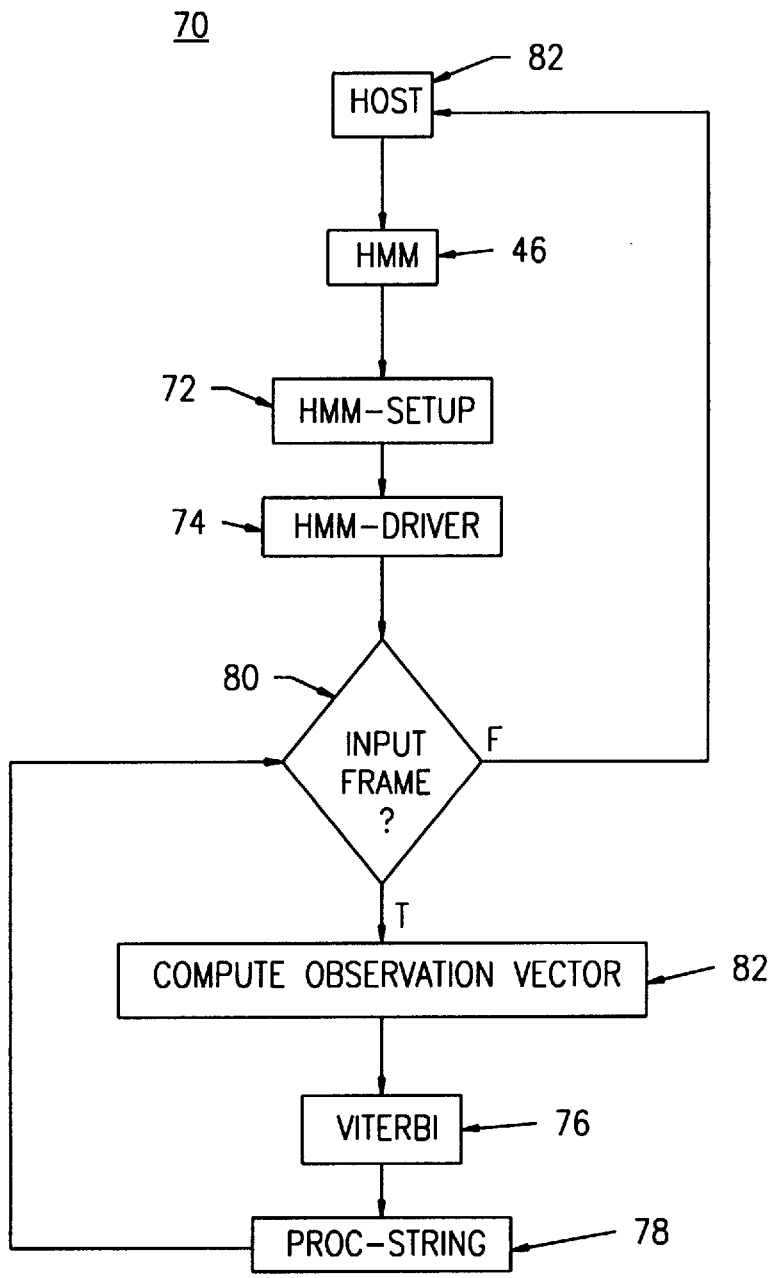
FIG. 4 is a flow-chart of the DSP implementation of the present invention.

Referring to FIG. 4, the DSP recognition system 70 consists of four software modules, routine hmm_setup 72, routine hmm_driver 74, subroutine Viterbi 76, and subroutine proc_string 78.

First, an HMM model 46 prepared by the training algorithm described above is downloaded from a host computer 82 to the DSP 70. It should be understood that the HMM can be pre-loaded into the DSP memory or can be stored in ROM (not shown). The static energy term is removed from contributing in order to perform the radio task in realtime, whereas the delay needed to normalize the static energy term is easily accomodated during non-realtime training.

Next, routine hmm_setup 72 is called to initiate a recognition session, which prepares the DSP 70 to perform the recognition. The processing performed by routine hmm_setup 72 allocates sufficient memory for the buffers required to perform the recognition. These buffers and other HMM variables are then initialized into the configuration required at the beginning of the recognition. The information required for the allocation and initialization procedures is provided by the HMM model 80 prepared in the training procedure discussed above.

At the completion of routine hmm_setup 72, the DSP 70 performs recognition on the incoming stream of speech parameters via routine hmm_driver 74. For each frame of unknown speech 80 uttered by the user, routine hmm_driver 74 computes an observation vector 82, calls subroutine Viterbi 76, and calls subroutine Proc_string 78, respectively.

An observation probability vector is a measure of the match between the unknown frame and each state (node) in the model. Computation of the observation (log) probability vector 82 is essentially the same as is performed in the Sparc implementation 50 described above. However, since memory on the DSP 70 is too limited to allow storage of a distance table, the distance computation is computed directly on the DSP 70 via Laplacean methods, as opposed to the table-lookup approach used in the Sparc implementation. Thus, due to the pipelining in the DSP code, the direct distance computation is very efficient.

Additionally, since DSP memory accessed from consecutive locations or locations which differ by a constant value are extremely efficient, the processing of vectors which are stored in this fashion can be performed by utilizing registers as memory pointers. Updating of the register value can occur during the same cycle used for memory access. Accordingly, as in the SPARC implementation 50, model parameters are stored consecutively wherever possible to take advantage of this efficiency.

Upon calculation of the observation probability vector, routine hmm_driver 74 then calls subroutine Viterbi 76 and subroutine proc_string 78. Specifically, subroutine Viterbi processes the observation vector and updates the total probability vector and the backpointer vector. The purpose of subroutine Viterbi is to update the optimal path to each node in the HMM at the current point in time (the current frame). This procedure involves computing the most probable path beginning at frame 1 and terminating at the current frame. Being a first-order Markov model, the process is only a function of the current observation vector and the probabilities of the paths terminating at the nodes of the previous frames.

The output of subroutine Viterbi 76 is a vector of "back pointers" for each node in the model. At time frame i, the backpointer for each node points to the node from the previous time frame (i-1) which optimizes the path to that node. The optimal node from time (i-1) is chosen as the node corresponding to the most probable path from time frame 1 though time frame (i-1).

Figure 5:
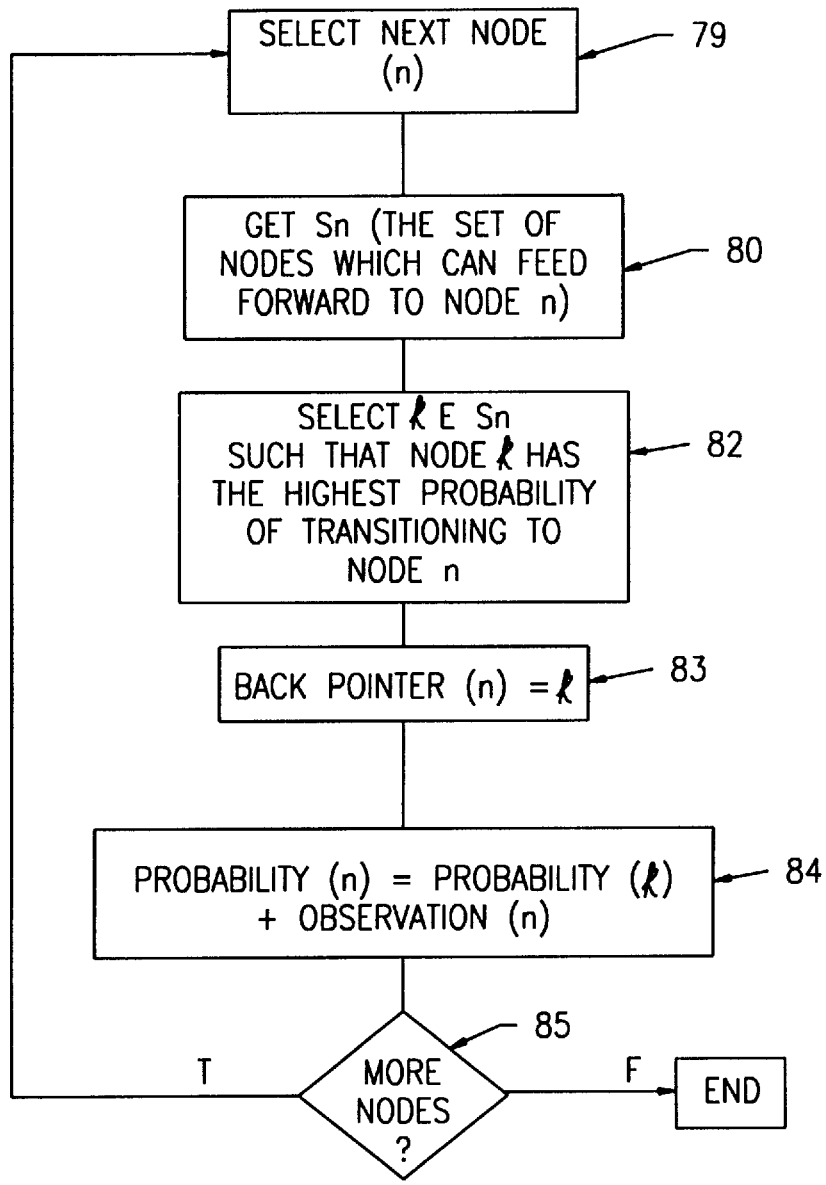
FIG. 5 is a flow-chart of the Viterbi algorithm of the present invention.

Referring to FIG. 5, for each node n 79, the HMM model specifies a subset of nodes which can feed-forward to that node 80. $S_n$ equals the subset of nodes which can feed-forward to node n. Next, the subroutine selects $k \in S_n$, such that the node (k) has the highest probability of transitioning to node n 82. Additionally, backpointer (n) equals k 83 and probability (n) equals probability (k)+ observation (n) 84. The steps are repeated for each additional node 85.

At the end of subroutine Viterbi for frame i, an updated probability vector specifying the total probabilities of the best path terminating at each node is provided 84. Additionally, an updated backpointer vector specifying the pointer from each node n at time i to the previous time's node associated with the best path to n is provided. Further, the fixed-point probability vector is normalized at the end of each frame to sum to a constant value to avoid quantization errors.

Figure 6:
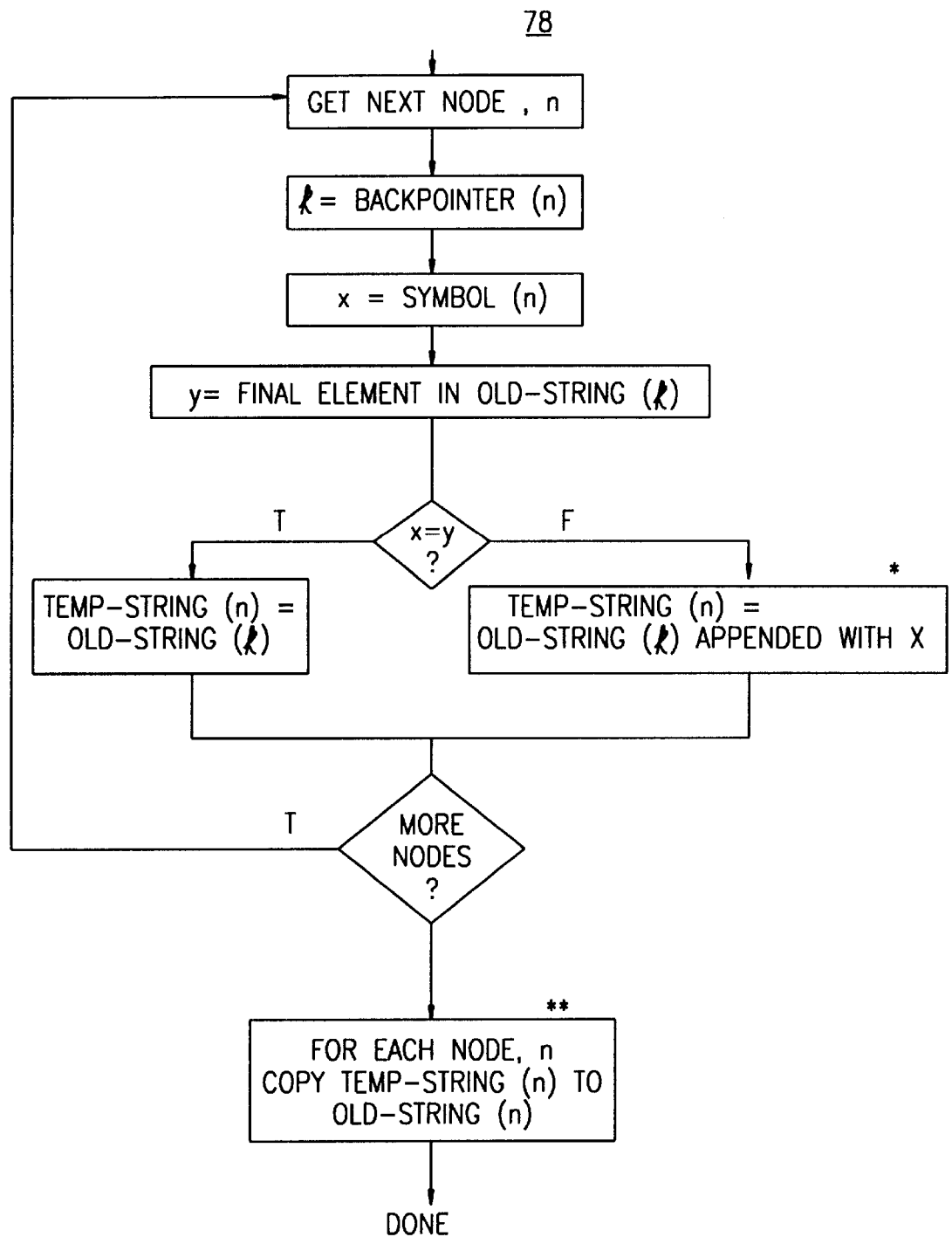
FIG. 6 is a flow-chart of the Proc-String algorithm of the present invention.

Referring to FIG. 6, the subroutine proc_string 78 processes the backpointer vector to update the symbol strings at the completion of subroutine Viterbi, which are defined by the most probable path to each node in the model. This subroutine is similar to conventional backtracing methods for updating the symbol strings. However, unlike conventional matrix approaches to backtracing, subroutine proc_string permits the recognition to run on a limited memory.

Figure 7:
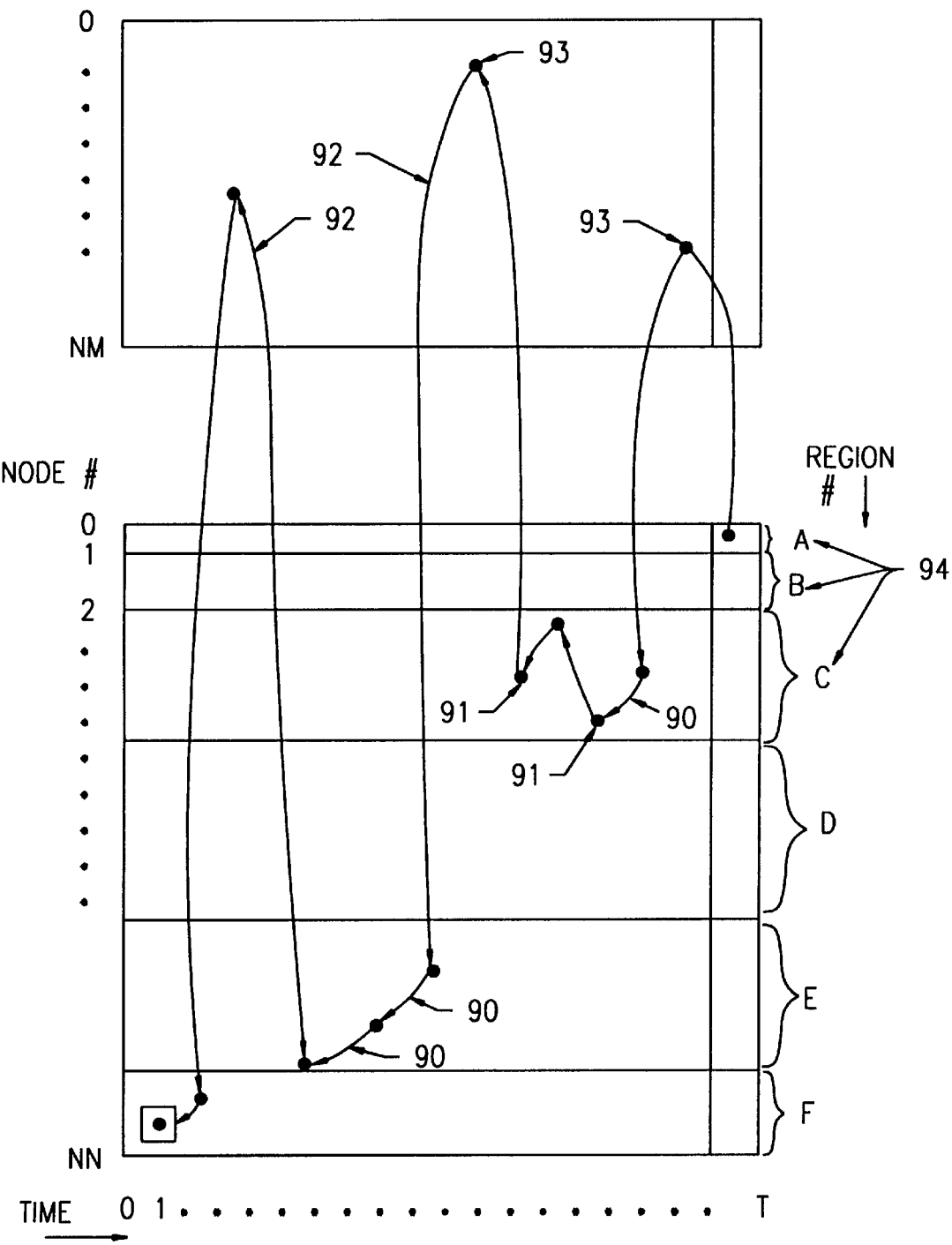
FIG. 7 is a plot of time versus nodes for conventional matrix backtracing.
Figure 8:
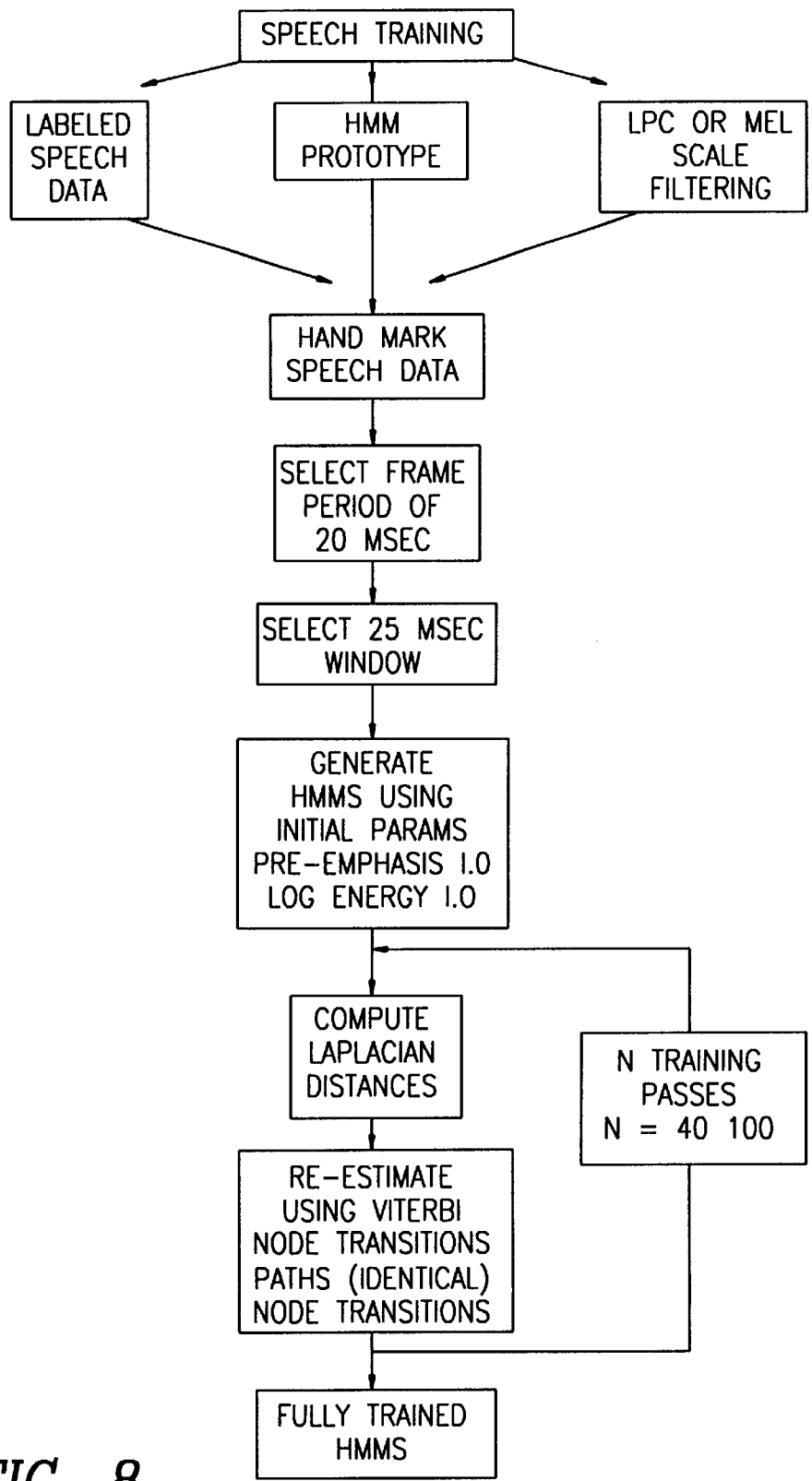
FIG. 8 is a flowchart depicting the training of HMMs according to this invention.

A plot of conventional matrix backtracing is shown in FIG. 7. For an input (unknown) utterance of T frames, the subroutine Viterbi computes a matrix of backpointers 90 for the normal nodes 91 and a matrix of backpointers 92 for the meta nodes 93 in the HMM. These matrices comprise of T column vectors, whereby each column t represents the backpointers computed for input frame number t (0<t<T), and are ordered in time from left to right. The normal nodes are subdivided into distinct regions 94 which are associated with the output events of the HMM (words). Additionally, a specific terminal event in the finite-state grammar is provided, which is shown as the region at the top of FIG. 7.

Generally, conventional matrix approaches to backtracing find the path through the backtrace matrix which begins at the first frame and terminates at the upper right corner of the matrix (at frame T and in the terminal-event node). This involves the simple procedure of following the pointers backthrough the matrix (for normal only) and concatenating the symbol associated with each event region which the path follows. Although the path may stay in an event region for several consecutive frames, only one symbol is provided for each foray into a region unlike convention matrix approaches to backtracing.

Unlike conventional matrix approaches to backtracing, the algorithm of the present invention is performed by decoding the Viterbi path "on the fly" (on a frame-by-frame basis). The problem with such framewise path decoding is the fact that no "starting point" is provided for decoding a single best path as there is with backtacking. Therefore, all possible paths must be accounted for and a matrix of data must be kept as large as with conventional methods. However, one way to reduce this burden is to prune paths along which the cumulative probability is below a threshold.

Specifically, the nodes on the optimal path through the backpointer matrix are represented as $n_k$, where k is the frame (column) number of the matrix (0<k<T). At time-frame k, a set of NN optimal paths are provided starting at frame 0 and terminating at each node $n_k$ (where NN is the number of normal nodes in the HMM). A string of output symbols are associated with each of these paths, which are obtained by mapping node regions into their associated symbols. Since the paths remain in the same region for several consecutive frames at each time, there is a great reduction in memory requirements, which is achieved by storing the set of symbol strings which terminate at nodes $n_k$, rather than the path coordinates themselves.

Further, a buffer of a given fixed length, such as 25, is reserved for each of the NN normal nodes in the HMM. At time-frame k, the buffer associated with node n comprises the string of symbols which are obtained by encoding the best path to $n_k$. These symbols are stored as short integers that map "one-to-one" with the actual output symbols, which are the vocabulary words plus a set of acoustic and electrical events such as "silence" and "push-to-talk". For utterances in which the number of frames T is known, the symbol string with the terminal node at frame T represents the best estimate of the utterance.

Finally, each of the NN symbol strings at time-frame k are updated. For each normal node n, the nodes that are determined by the subroutine Viterbi from the previous time-frame (k-1) to lie on the optimal path which terminates at $n_k$ are stored in the vector normal_backpointer, which is of order NN. Next, let j equal normal_backpointer [$n_{k-1}$]. If j is a positive number, then the symbol string associated with node j at time k-1 is copied to the symbol string associated with node $n_k$ at time k. If the symbol associated with node nk is different that the last symbol in the new string, then the new symbol is concatenated to the new string. (Note that there is an "old" string and a "new" string associated with each node, and that the pointers to the two buffers are toggled at the end of each frame).

On the other hand, if j is a negative number, then it refers to a metanode. The metanode_backpointer vector is set up so that it can be accessed through negative indexing of the normal_backpointer vector. Next, j=normal_backpointer [j] is iteratively computed until j is positive. Finally, the symbol strings are updated through the procedure for updating positive numbers, as described above. In the event that a string length exceeds the buffer length, the buffer is used in a circular fashion.

Routine hmm_driver is concluded when there are no more speech frames to process. The optimal symbol strings are then uploaded to the host processor for operation and control purposes. In the voice recognition system and method of the present invention, the symbol strings are uploaded for performing the radio-control tasks uttered by the user.

Although the present invention was developed for performing radio-control tasks, it is thus suitable for other speech recognition applications in speaker-independent environments, for example, the control of machine operations by spoken commands or control words, such as placing telephone calls by voice, voice control of office equipment, machines or toys. In addition, the present invention may be employed for other systems, such as, automated reservation systems, computer-aided instruction systems, information retrieval systems. Thus, it should be understood that the present invention is not limited to radio-control tasks.

Accordingly, the present invention provides a system and method for performing speech recognition that is more accurate with the imposed computational constraints than those of the prior art. For example, the present invention can successfully perform a large number of iterations during training to capture more details from the data without resulting in decreased performance, which typically occurs in the systems and methods of the prior art. In fact, the exemplary embodiments of the present invention achieve a phrase rate of 94.5% correct and a word rate of over 98% correct.

Additionally, the present invention provides a system and method for recognizing speech that is highly efficient and does not require a database as large as those typically required in the prior art. Further, the present invention eliminates the need to save the backpointer matrices during recognition, which is required in several of the conventional recognition approaches. As a result, significant memory savings are achieved.

Further, the present invention provides a system and method for performing speech recognition that is faster than those of the prior art, since conventional voice recognition systems and methods are typically slow and require excess amounts of time to perform.

Still further, the present invention provides a method for voice recognition that successfully implements 8 and 16-bit integers to represent probabilities, instead of the commonly used floats of the prior art. This substitution does not incur any degradation of performance.

In addition, the present invention provides a system and method for voice recognition that utilizes Laplacean likelihoods for recognition, instead of conventional Gaussian likelihoods. Such substitution provides the complete reoptimization of all the other parts of the invention.

Finally, the present invention provides a system and method for voice recognition that implements a real time Viterbi algorithm that achieves real time speech recognition without incurring any loss of numerical precision. Further, the present invention utilizes metanodes, thereby greatly improving the efficiency of the invention.

While preferred forms and arrangements have been shown in illustrating the invention, it is to be understood that various changes may be made without departing from the spirit and scope of this disclosure.

What is claimed is:

1. A method for recognizing spoken utterances of a speaker, comprising the steps of:
   providing a database of labeled speech data;
   providing a prototype of a Hidden Markov Model (HMM) definition to define the characteristics of the HMM;
   parameterizing speech utterances according to one of linear prediction parameters or Mel-scale filter bank parameters;
   selecting a frame period of approximately 20 msecs and a window duration of substantially 25 msecs for accommodating said parameters;
   generating HMMs and decoding to specified speech utterances by causing said speaker to utter predefined training speech utterances for each said HMM,
   statistically computing said generated HMMs with said prototype HMM to provide a set of fully trained HMMs for each utterance indicative of said speaker;
   using said trained HMMs for recognizing a speaker by computing Laplacian distances for utterances of said speaker during said selected frame period; and
   iteratively decoding node transitions corresponding to said spoken utterances during said selected frame period to determine which predefined utterance is present.

2. The method according to claim 1, further including the step of hand marking said speech data for seeding the training of HMMs said step of hand marking occurring between the steps of parameterizing said speech data and selecting a frame period for accommodating said parameters.

3. The method according to claim 1, wherein said node transitions correspond to node transition paths extending through a lattice, wherein said node transition paths are identical at each iteration.

4. The method according to claim 3, wherein said node decoding is viterbi decoding.

5. The method according to claim 3, wherein the step of decoding further includes providing a backpointer vector for optimizing optimal paths to each of the nodes.

6. The method according to claim 1, wherein the step of generating HMMs further includes a preemphasis coefficient of approximately 1.0 and a scale log energy setting of approximately 1.0.

7. The method according to claim 6, wherein said fully trained HMMs are trained in at least 40 training passes.

8. The method according to claim 6, wherein said fully trained HMMs are trained in approximately 100 training passes.

9. The method according to claim 1 wherein said Laplacian distances are stored in a lookup table.

* * * * *